United States Patent
Tyni et al.

(10) Patent No.: US 12,091,285 B2
(45) Date of Patent: Sep. 17, 2024

(54) METHOD FOR DETERMINING THE WEIGHT OF THE CAR AND COUNTERWEIGHT IN AN ELEVATOR

(71) Applicant: KONE Corporation, Helsinki (FI)

(72) Inventors: Tapio Tyni, Helsinki (FI); Pekka Perälä, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1385 days.

(21) Appl. No.: 16/503,877

(22) Filed: Jul. 5, 2019

(65) Prior Publication Data

US 2019/0330016 A1    Oct. 31, 2019

Related U.S. Application Data

(63) Continuation of application No. PCT/EP2017/052683, filed on Feb. 8, 2017.

(51) Int. Cl.
*B66B 5/00* (2006.01)
*G01G 19/14* (2006.01)

(52) U.S. Cl.
CPC .......... *B66B 5/0087* (2013.01); *B66B 5/0037* (2013.01); *G01G 19/14* (2013.01)

(58) Field of Classification Search
CPC .......... B66B 5/0037; B66B 5/18; B66B 5/00; B66B 1/30; B66B 5/0093; B66B 5/04;
(Continued)

(56) References Cited

U.S. PATENT DOCUMENTS 7,971,688 B2 *   7/2011   Perala ................... B66B 1/3407
                                                            187/293
2010/0276230 A1   11/2010   Peräläet al.
(Continued)

FOREIGN PATENT DOCUMENTS

AU   2020462252 A1 *   3/2023   ............... B66B 1/30
CN   104803246 A         7/2015
(Continued)

OTHER PUBLICATIONS

International Search Report issued in PCT/EP2017/052683 (PCT/ISA/210), dated Jan. 3, 2018.
(Continued)

*Primary Examiner* — Marlon T Fletcher
(74) *Attorney, Agent, or Firm* — Birch, Stewart, Kolasch & Birch, LLP

(57) ABSTRACT

A method for determining the mass of a car and counterweight of an elevator, running in an elevator shaft along their traveling paths driven by an elevator motor, in which method at least one test run is performed preferably as complete round trip of the elevator car and counterweight, in which test run a) the hoisting system balance $m_B$, b) the hoisting system friction $F_{\mu S}$, and c) the hoisting system compensation $\Delta B$ is calculated from constant speed data, and in which test run d) the hoisting system inertia mass $m_I$ is calculated from constant acceleration/deceleration data. From these parameters the weight of the car and counterweight is calculated without any need of weight measurements, but merely by using the power data of the elevator drive unit.

20 Claims, 3 Drawing Sheets

Elevator power terms over a round trip

(58) Field of Classification Search
CPC ......... B66B 5/0006; B66B 5/048; B66B 5/14;
B66B 1/3476; B66B 19/007; B66B 11/08;
B66B 11/0407
See application file for complete search history.

(56) References Cited

U.S. PATENT DOCUMENTS

2015/0019182 A1* 1/2015 Tyni ................. B66B 1/3407
703/2
2015/0142339 A1   5/2015 Liu

FOREIGN PATENT DOCUMENTS

| CN | 105008260 A | * | 10/2015 | ........... B66B 1/3476 |
| CN | 110234587 A | * | 9/2019 | ........... B66B 5/0037 |
| CN | 110234587 B | * | 12/2021 | ........... B66B 5/0037 |
| EP | 2774885 A1 | * | 9/2014 | ........... B66B 1/3476 |
| WO | WO 2013/113862 A1 | | 8/2013 | |
| WO | WO 2014/135408 A1 | | 9/2014 | |
| WO | WO-2018145734 A1 | * | 8/2018 | ........... B66B 5/0037 |

OTHER PUBLICATIONS

Tyni et al., "Electric Site Survey—On Quest of Elevator Parameters", Elevator Technology 19, Proceeding of ELEVCON 2012, May 24, 2012, pp. 1-13.
Written Opinion of the International Searching Authority issued in PCT/EP2017/052683 (PCT/ISA/237), dated Jan. 3, 2018.

* cited by examiner

Figure 1. Elevator power terms over a round trip

Figure 2. Significant power terms during constant speed inside red dashed areas

METHOD FOR DETERMINING THE WEIGHT OF THE CAR AND COUNTERWEIGHT IN AN ELEVATOR

CROSS REFERENCE TO RELATED APPLICATIONS

This application is a Continuation of PCT International Application No. PCT/EP2017/052683, filed on Feb. 8, 2017, which is hereby expressly incorporated by reference into the present application.

BACKGROUND OF THE INVENTION

The present invention relates to a method for determining the car mass or weight in an elevator, and, as far as the elevator also comprises a counterweight also the weight of the counterweight.

Often, particularly during the modernization of existing elevators and elevator groups, a new elevator motor and motor drive is installed in an existing elevator. For the optimization of the new motor drive and elevator motor to the existing elevator system, it is preferable to know the weight of the elevator car and the counterweight in the elevator system.

Usually, the weight of a counterweight corresponds to the weight of the empty elevator car plus the half of the nominal load of the elevator. As often during the lifetime of an elevator, several modifications are made at the elevator car and also at the counterweight the real values often deviate essentially from the above assumptive theoretical values. Sometimes there are information plates at the elevator components with the properties of the elevator component as e.g. the weight. But as mentioned above, the weight may have been modified during the operating time of the elevator. The weighing of the elevator components, i.e. the weighing of the elevator car and the counterweight are laborious tasks which would need essential effort and costs. A method for retrieving a balance check in an elevator system is known from EP 2 774 885 B2.

It is therefore aim of the present invention to provide a method that allows to determine the weight of an elevator car and that of a counterweight, particularly in an existing system which is to be modernized. As shown in FIG. 3, the elevator system after modernization includes the existing system including the elevator shaft 4, the elevator car 1 and the counterweight 2, and the new elevator motor 3.

The object is solved with a method as well as with an elevator system according to the independent claims. Preferred embodiments of the invention are subject matter of the dependent claims. Preferred embodiments of the invention are also described in the specification and drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

1. Calculations of the Elevator Hoisting System Balance

The invention is based preferably on a power model of an elevator as it is known from WO 2014/135408 A1 which is herewith made part of the present application. According to this document the elevator hoisting system balance $m_B$, i.e. the weight difference between the weight of the car and counterweight can be expressed as follows:

$$m_B = m_{car} - m_{cw} \quad (1.1)$$

When the elevator is running the power and energy supplied to the elevator motor is consumed in change of kinetic energy, potential energy as well as friction, copper and iron losses according to following formula 1.1.

$$P_m = P_K + P_P + P_{Fr} + P_{Cu} + P_{Fe} \quad (1.2)$$

In formula (1.2) $P_M$ stands for motor electric power, $P_K$ for kinetic power, $P_P$ for potential power, $P_{Fr}$ for friction losses, $P_{Cu}$ for motor internal losses in the winding resistance and $P_{Fe}$ motor internal iron losses.

Figure 1:
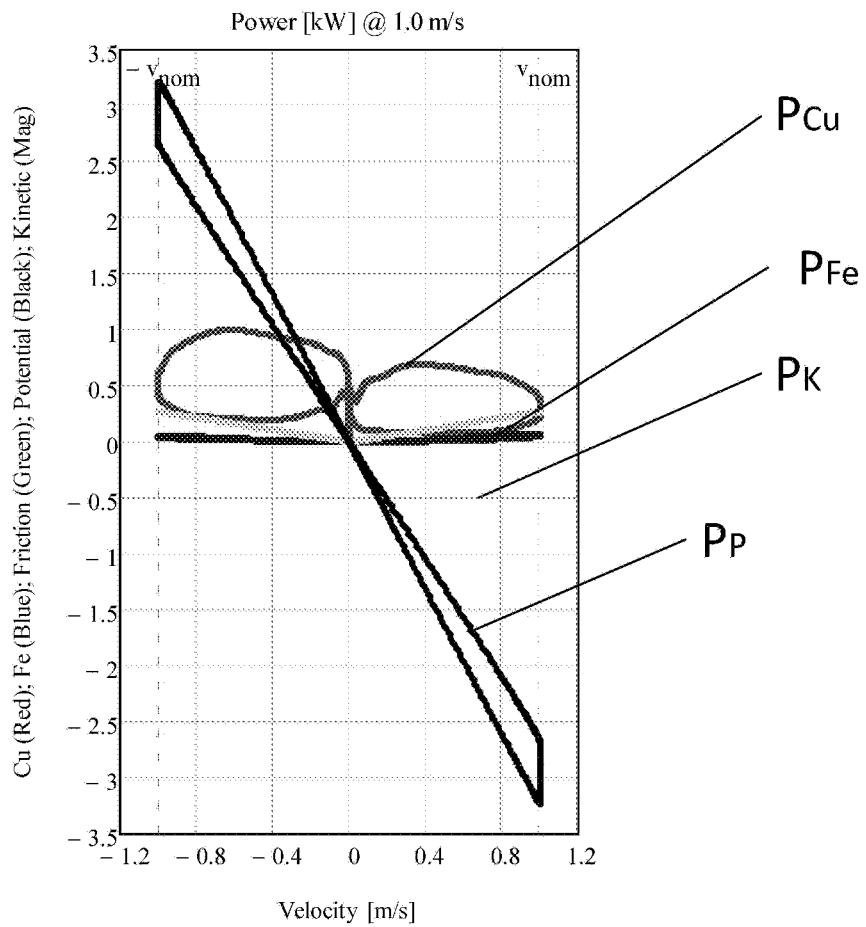
FIG. 1 illustrates power terms for an example wherein an elevator with a nominal load of 630 kg is driving with a nominal velocity of 1 m/s through an elevator shaft with a travel length of the elevator car of 18 m.

FIG. 1 illustrates these power terms for an example wherein an elevator with a nominal load of 630 kg is driving with a nominal velocity of 1 m/s through an elevator shaft with a travel length of the elevator car of 18 m.

During the constant speed state the acceleration is zero and kinetic power diminishes to zero ($P_K = m_f \cdot v \cdot a = 0$). Copper losses can be calculated from the motor current $I_M$ and motor winding resistance $R_S$, $P_{Cu} = I_M^2 \cdot R_S$, and subtracted from the motor input power.

Figure 2:
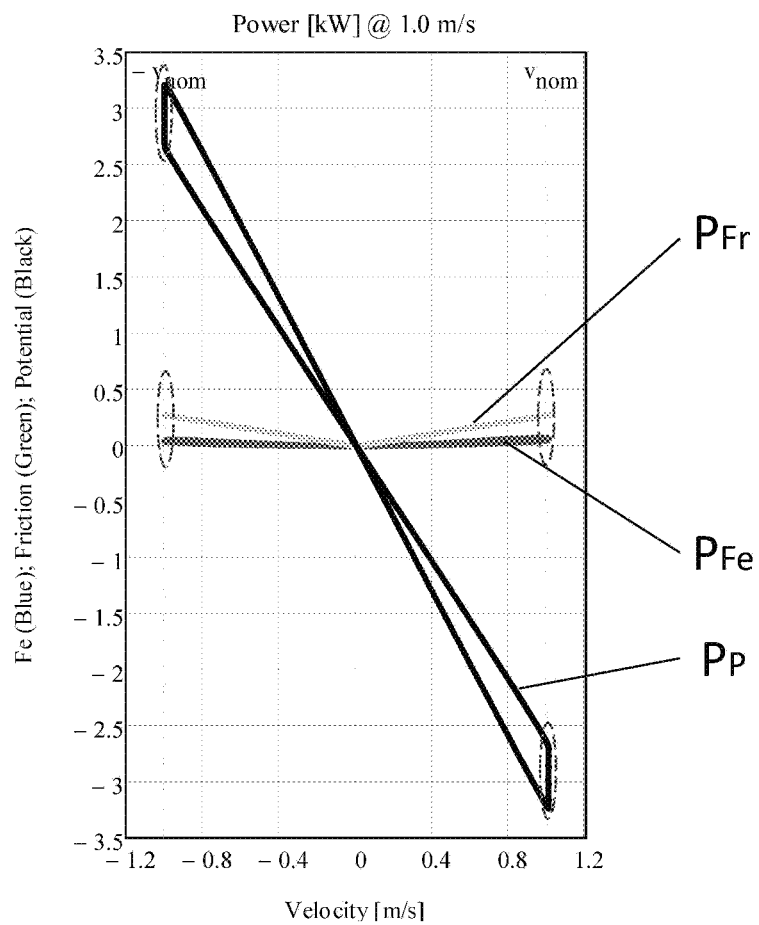
FIG. 2 illustrates the remaining powers, which will be the potential power, friction and iron losses, for the example in FIG. 1.
Figure 3:
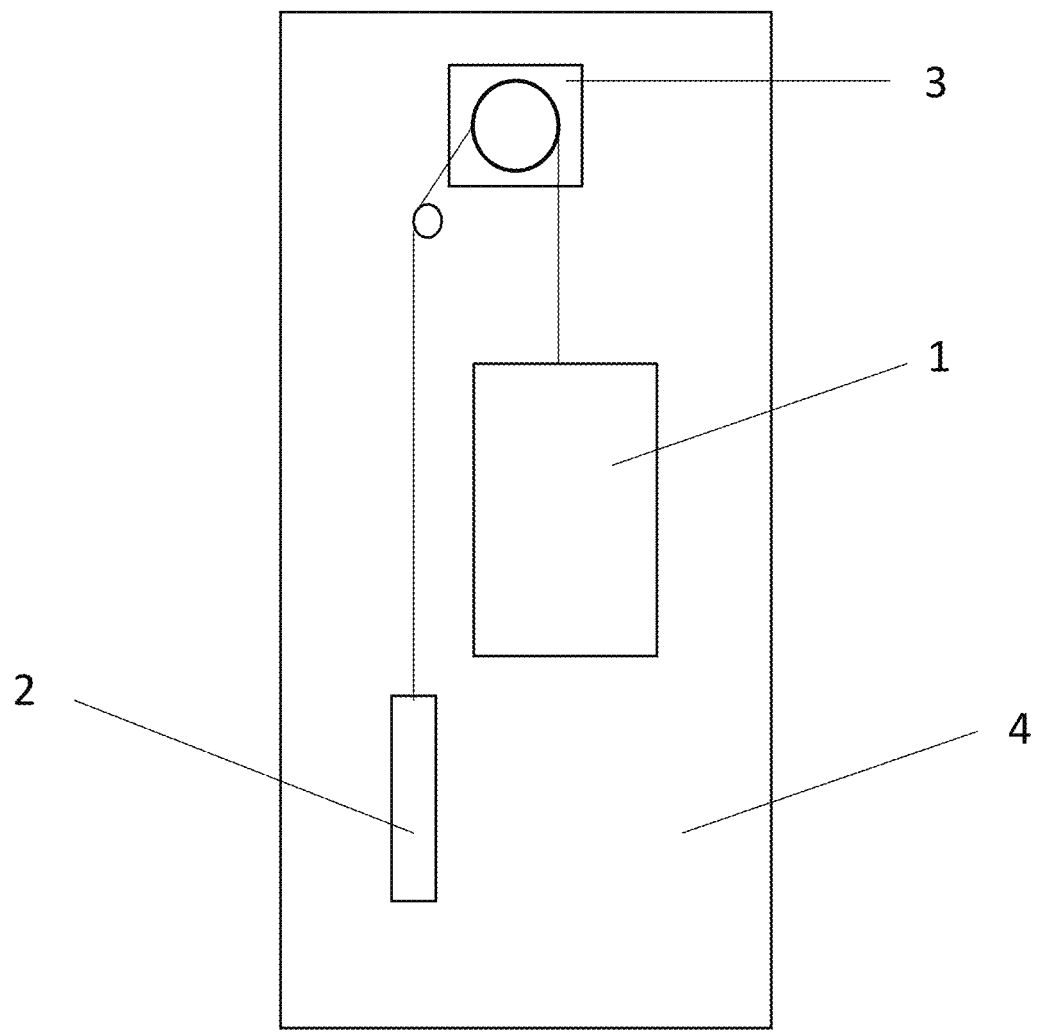
FIG. 3 illustrates schematically an elevator according to an embodiment of the invention.

Under these conditions the remaining powers will be the potential power, friction and iron losses as they are shown in FIG. 2.

Thus, during the constant speed travel the motor power with the removal of copper losses motor power simplifies to $$P_m - P_{Cu} = P_{ME} = P_P + P_{Fr} + P_{Fe} \quad (1.3)$$

Frictions (guide shoe, rope bending, bearing and wind) are in practice independent of the running direction, $P_{Fr.up} = P_{Fr.dn} = P_{Fr}$. Iron losses are function of speed and motor current, so they are sensitive to the running direction. However, as we see from the figure, their magnitude is much smaller than the kinetic power levels and the difference between the two running directions is even smaller. So preferably it is assumed that the iron losses are independent of the running direction $P_{Fe.up} \approx P_{Fe.dn} = P_{Fe}$.

The mean power difference of the both running directions can be derived $$m_B = \frac{1}{2}((\text{mean}(P_{MEup}) - \text{mean}(P_{MEdn}))(gv_{test})^{-1}) \quad (1.4)$$

Mean power difference means here the power difference in the middle of the travel length of the elevator car in the shaft. In (1.3) $m_B$ is the elevator system balance in kilograms in the middle of the shaft, $v_{test}$ is the speed of the elevator during the test and g is the gravitational acceleration 9.81 m/s².

In words this means that the drive unit or inverter can calculate the elevator system balance at the middle point of the shaft by calculating, during the constant speed, the average of motor current, from which the copper losses are removed, to both up and down directions, and dividing the difference with test velocity $v_{test}$ and g.

Table 1 shows results of a test that was conducted to check the operation of the theory in practice with the example elevator. The correct balancing of the elevator is −300 kg.

TABLE 1

Balancing results with different combinations of error sources removed

| "P.Cu" | "P.Fe" | "m.B [kg]" |
|---|---|---|
| 0 | 0 | −316 |
| 0 | 1 | −317 |
| 1 | 0 | −300 |
| 1 | 1 | −301 |

(1 = power term removed from motor power)

It can be seen that it is needed to remove the copper losses from the motor supply power and the assumption of insignificance of iron losses is applicable. The balance value has negative sign as the counterweight is heavier than the car.

2. Calculation of the Hoisting System Friction

According to the invention the elevator shaft average friction over the round trip is calculated according to formula 2.1.

$$F_{\mu S} = \frac{1}{2}((\text{mean}(p_{MEup}) + \text{mean}(p_{MEdn}))(v_{test}^{-1}) \quad (2.1)$$

The friction above accumulates three kind of frictions: friction of bearings at the test speed, rope bending friction and guide shoe friction. For example in low-rise elevators the bearing friction is a minor term of these three friction terms while the guide shoe sliding friction dominates the accumulated friction $F_{\mu S}$. Thus this $F_{\mu S}$ friction can optionally be used to check an overall shaft alignment and lubrication condition of the elevator. As average value the arithmetic mean value is used. Anyway, other averages calculation methods that do not lead to essentially different values can be used.

3. Calculation of the Hoisting System Balance Shift

For a dynamic compensation of the hoisting system the unit mass [kg/m] of compensation ropes ($um_{CR}$) should conform to the following equation:

$$um_{CR} = R \cdot um_{SR} + \frac{1}{2} um_{TC} \quad (3.1)$$

with
$um_{SR}$=unit mass of the hoisting ropes,
$um_{TC}$=unit mass of the traveling cable
(unit mass=mass/length)
R is the roping ratio, e.g. 1:1, 2:1 or 4:1. If formula (3.1) applies, the hoisting system maintains its balance throughout the entire travel from bottom to top floor. If not, the compensation error or balance shift ΔB [kg/m] is to be calculated from (3.2) as $$\Delta B = um_{CR} - R \cdot um_{SR} - \frac{1}{2} um_{TC} \quad (3.2)$$

To calculate this balance shift ΔB (or hoisting system compensation) according to formula (3.2) the data from constant speed regions of test round trip is needed as mentioned above. According to a preferred embodiment of the invention the hoisting system compensation ΔB can advantageously be calculated from the constant speed data with linear regression, for example as follows:

$$\Delta B_{up} = \frac{\text{cov}(P_{ME \cdot up}, h_{up})}{\text{var}(h_{up})} (v_{test} g)^{-1} \quad (3.3)$$

$$\Delta B_{dn} = -\frac{\text{cov}(P_{MEdn}, h_{dn})}{\text{var}(h_{dn})} (v_{test} g)^{-1}$$

-continued $$\Delta B = \frac{1}{2}(\Delta B_{up} + \Delta B_{dn})$$

The variance var( ) and covariance cov( ) can be calculated as one-pass algorithms in a per-se known manner.

4. Calculation of the Total Moving Effective Inertia Mass

Thus, the total moving inertia mass $m_I$ [kg] of the elevator hoisting system is calculated as $$m_I = \text{mean}\left(\frac{P_{ME} - B(h)gv - CF_{\mu S}|v|}{av}\right) \quad (4.1)$$

Where a, v, h and $P_{ME}$ are the acceleration, velocity and actual height position, which parameters are measured when the elevator is accelerating or decelerating at a constant rate (jerk=0). The parameter C is a constant which according to the elevator design, roping ratio etc. . . . differs between 2/5 and 4/5, but preferably has the value of 2/3 for traction sheave elevators with a counterweight and a roping ratio between 1:1 and 1:4. The term B(h) is the balance shift of the hoisting system during the test run $$B(h) = \Delta B(h - \frac{1}{2} h_{nom}) \quad (4.2)$$

with h being the actual position of the elevator and $h_{nom}$ being the nominal travel length of the elevator car (or counterweight in case of identical rope ratios) in the shaft.

Accordingly it is possible to obtain the moving inertia mass without any complicated weight measurements in the elevator shaft.

5. Calculation of the Car and Counterweight Mass

The system inertia mass $m_I$ comprises the inertia mass of all moving components, i.e. the linear moving components and the rotating components. The inertia mass $I_c$ of linearly moving masses depends on the roping ratio R and the location and role of the component in the hoisting system $$I_c = Km_c \quad (5.1)$$

where $m_c$ is the mass of a linear moving component of the elevator and K is a factor which is specified for different components and different roping ratios. The table below specifies some values for a common roping ration of 2:1.

The inertia moment $J_c$ of rotating components is preferably transformed in their linear corresponding value $I_c$ by following equation:

$$I_c = K^2 J_c / r_c^2 \quad (5.2)$$

where $r_c$ is the radius of the motor traction sheave or pulley (where ropes touch) and K is a factor depending on the elevator component and roping ratio, e.g. as specified below.

The following table gives exemplary values for the variable K of an elevator with a 2:1 roping, i.e. R=2.

linear components
  car & counterweight, K=1
  hoisting ropes, K=R
  compensation ropes, K=R
  OSG ropes, K=1
  travelling cables, K=1
rotating components
  motor, K=R
  diverting pulleys, K=R car & counterweight pulleys when 2:1 or more roping, K=1 compensator pulley, K=1

OSG pulleys, K=1

Now the car and counterweight masses can be calculated from $$m_{car} = \frac{1}{2}(m_I + m_B - \Sigma_i I \cdot c_i) \quad (5.3)$$

$$m_{cwt} = \frac{1}{2}(m_I - m_B - \Sigma_i I \cdot c_i) \quad (5.4)$$

where $\Sigma_i I_{ci}$ is the sum of the masses of the relevant, preferably of all moving components i of the elevator system. The linear inertia mass of ropes is calculated based on travel and moving section of ropes, roping ratio, number of ropes and the unit mass of ropes. The inertia torque of each rotating component shall be taken from data sheets or from stored information in the elevator control or in a service tool, e.g. laptop a service technician and is then transformed to linear mass with equation (5.2).

In practice the calculation according to the formulas under section 5 can be preferably carried out in a terminal, e.g. laptop, which contains tables for inertia torques and rope masses and calculation rules for different elevator concepts to consider the roping ratio etc. . . . . . Of course also these calculations can be performed in the elevator control, preferably in an electronic weight calculating unit thereof. This unit could be part of the elevator control, e.g. as elevator CPU software, particularly as the software could comprise stored information about the components the elevator is composed of.

6. Embodiment of the Inventive Mass Calculation Method

Hereinafter one example of the inventive determination of the car and counterweight mass is given. The parameters calculated in elevator control are $m_B$ [kg], $m_I$ [kg], $\Delta B$ [kg/m] and $F_{\mu S}$ [N]. The parameters which are calculated preferably in a separate mobile appliance, as e.g. a laptop of a technician are the weight of the car and counterweight $m_{car}$ [kg] and $m_{cwt}$ [kg].

Technician runs a full end-to-end test round trip, drive software shall calculate from constant speed data (a=0 @ $|v_{test}|$)

1. Hoisting system balance $m_B$ equation (1.4)
2. Hoisting system friction $F_{\mu S}$ equation (2.1)
3. Hoisting system compensation $\Delta B$ equation (3.2).

Drive software of an electronic weight calculation unit of the elevator control shall calculate from constant acceleration/deceleration data (j=0 @$|a_{nom}|$)

4. Hoisting system inertia mass $m_I$ equation (4.1)

The drive software shall pass the calculated parameters to a display as output means of the elevator control. A technician shall read of $m_B$ and $m_I$ from the display and enter them to laptop with a corresponding software, which computes the car and counterweight masses $m_{car}$ and $m_{cwt}$ from equations (5.3) and (5.4). In the app the technician chooses a correct elevator configuration and design as, machinery, rope types, pulleys, travelling cables etc. in order to obtain $\Sigma_i I_{ci}$ in equations (5.3) and (5.4). Preferably, in his app the technician also retrieves the correct variable K for calculating the moving inertia masses according to equations 5.1 and 5.2.

The weight of the car and counterweight are then displayed on the laptop display. The parameters can also be transmitted from the elevator control to the laptop via an interface or via a mobile data storage, e.g. flash memory. This reduces the danger of input errors by the service technician.

When designing the algorithms presented above special attention has been paid on to keep the equations computationally as simple as possible to enable easy implementation.

Following terms are used in this application as a synonyms:

hoisting system balance shift—hoisting system compensation; weight—mass

The invention claimed is:

1. A method, comprising:

installing a new elevator motor into an existing elevator;

performing a test run of the elevator with the new elevator motor;

determining the mass of a car and counterweight of the elevator, running in an elevator shaft along their traveling paths driven by the elevator motor, wherein in the test run:

a) the hoisting system balance $m_B$, b) the hoisting system friction $F_{\mu S}$, and c) the hoisting system compensation $\Delta B$ are calculated from constant speed data, and d) the hoisting system inertia mass $m_I$ is calculated from constant acceleration/deceleration data, and wherein the step of determining comprises the steps of:

calculating the hoisting system balance $m_B$, which is the difference between the weight of the car and the counterweight, from the power difference of the motor power when driving the car in both running directions with a constant velocity at a point when the elevator car is in the middle of a travelling length thereof in the elevator shaft;

calculating the hoisting system friction $F_{\mu S}$ from the addition of the motor power in both running directions in the middle of the shaft, divided by the car velocity of the test run, run; and calculating the hoisting system inertia mass $m_I$ from the motor power $$m_I = \text{mean}\left(\frac{P_{ME} - B(h)gv - CF_{\mu S}|v|}{av}\right)$$

with:

"mean" being the arithmetic mean value,

C being a constant, which is between 2/5 and 4/5, $P_{ME}$ being the motor power at constant speed, $B(h) = \Delta B(h - \frac{1}{2}h_{nom})$, g being the gravitational force, v being the nominal car velocity, h being the actual height position of the car along the traveling length, and $h_{nom}$ being the nominal travel length of the elevator in the shaft, wherein the parameters a, v h and $P_{ME}$ are obtained during test runs with constant acceleration/deceleration, wherein the system inertia mass $m_I$ represents the moving masses of all moved components of the elevator, wherein the car mass $m_{car}$ is calculated according to following formula:

$$m_{car} = \frac{1}{2}(m_I + m_B - \Sigma_i I \cdot c_i) \quad (5.3)$$

and wherein the counterweight mass $m_{cwt}$ is calculated according to following formula:

$$m_{cwt} = \frac{1}{2}(m_I - m_B - \Sigma_i I \cdot c_i) \quad (5.4)$$

with $\Sigma_i I_{ci}$ being the sum of inertia masses of the relevant linearly moving elevator components, except the car and counterweight; and modernizing the existing elevator according to the determined mass of the car and counterweight of the elevator to optimize the new elevator motor to the existing elevator.

2. The method according to claim 1, wherein $\Sigma_i I_{ci}$ also comprises the sum of the inertia masses of the relevant rotating elevator components, whereby the inertia moment Jc of a rotating component is transformed into a corresponding linear value $I_c$ by following equation:

$$I_c = K^2 J_c / r_c^2 \qquad (5.1)$$

wherein $r_c$ is the radius of the rotating component (where ropes touch) and K is a factor depending on the elevator component and roping ratio.

3. The method according to claim 1, wherein the hoisting system compensation ΔB is calculated from the unit masses of the suspension rope under consideration of the roping ratio, of the compensation rope—if present, and of the travelling cable according to following formula:

$$\Delta B = um_{CR} - R \cdot um_{SR} - \tfrac{1}{2} um_{TC}.$$

4. The method according to claim 1, wherein the hoisting system compensation ΔB is calculated from constant speed portions of a test run of the elevator car as follows:

$$\Delta B_{up} = \frac{\mathrm{cov}(P_{ME \cdot up}, h_{up})}{\mathrm{var}(h_{up})} (v_{test} g)^{-1}$$

$$\Delta B_{dn} = -\frac{\mathrm{cov}(P_{MEdn}, h_{dn})}{\mathrm{var}(h_{dn})} (v_{test} g)^{-1}$$

$$\Delta B = \frac{1}{2}(\Delta B_{up} + \Delta B_{dn})$$

with var( ) being the variance and cov( ) being the covariance.

5. The method according to claim 4, wherein the variance and covariance are calculated as one-pass algorithms.

6. The method according to claim 1, wherein the hoisting system balance $m_B$ is calculated according to following formula:

$$m_B = \tfrac{1}{2}((\mathrm{mean}(P_{MEup}) - \mathrm{mean}(P_{MEdn}))(gv_{test})^{-1}),$$

with "mean $(P_{MEup})$" being the value of the motor power $P_{ME}$ in up-direction in the middle of the travelling length of the elevator car, and with "mean $(P_{MEdn})$" being the value of the motor power $P_{ME}$ in down-direction in the middle of the travelling length of the elevator car.

7. The method according to claim 1, wherein the hoisting system friction $F_{\mu s}$ is calculated from the friction over a round trip of the elevator car via following equation:

$$F_{\mu s} = \tfrac{1}{2}((\mathrm{mean}(p_{MEup}) + \mathrm{mean}(p_{MEdn}))(v_{test}^{-1})$$

with "mean $(P_{MEup})$" being the value of the motor power $P_{ME}$ in up-direction in the middle of the travelling length of the elevator car, with "mean $(P_{MEdn})$" being the value of the motor power $P_{ME}$ in down-direction in the middle of the travelling length of the elevator car, and $V_{test}$ being the velocity of the elevator car during the test run.

8. The method according to claim 1, wherein the parameter data $m_B$, $m_I$, ΔB and $F_{\mu s}$ are calculated in the elevator control during the test runs and are outputted on an output device.

9. The method according to claim 1, wherein the parameters $m_{car}$ and $m_{cwt}$ are calculated in a mobile device from the parameter data of the output device of the elevator control.

10. The method according to claim 1, wherein the power $P_{ME}$ of the elevator motor is determined by a power measuring circuit.

11. The method according to claim 10, wherein the elevator comprises an electronic weight calculating unit, which is connected to a position reading means of the elevator car and/or counterweight and which initiates the power measuring circuit to determine the actual power consumption $P_{ME}$ of the elevator motor when the position reading means indicates the position of the elevator car or counterweight being in the middle of the traveling length in the elevator shaft.

12. The method according to claim 1, wherein the calculated hoisting system friction $F_{\mu s}$ is used to check an overall shaft alignment and lubrication condition.

13. An elevator system comprising at least one elevator car traveling in an elevator shaft along a traveling length thereof driven by an elevator motor controlled by an elevator control, wherein the elevator control comprises an electronic weight calculating unit, which is connected with:

a car/counterweight position reading means of the elevator control, and a power measuring circuit of the elevator control, which is configured to measure the actual power consumption of the elevator motor, wherein the electronic weight calculating unit is configured to perform the method according to claim 1.

14. The elevator system according to claim 13, wherein the electronic weigh calculating unit is configured to calculate from a test run of the elevator:

a) the hoisting system balance $m_B$, b) the hoisting system friction $F_{\mu s}$, and c) the hoisting system compensation ΔB from constant speed data, and d) the hoisting system inertia mass $m_I$ from constant acceleration/deceleration data of the test run, wherein the electronic weight calculation unit is connected to an output device of the elevator to output the calculated parameters $m_B$, $F_{\mu s}$, ΔB and $m_I$, and which elevator system comprises a terminal unit configured to receive the parameters $m_B$, $F_{\mu s}$, ΔB and $m_I$ and to calculate the car weight $m_{car}$ and counterweight weight $m_{ctw}$ therefrom.

15. The method according to claim 2, wherein the hoisting system compensation ΔB is calculated from the unit masses of the suspension rope under consideration of the roping ratio, of the compensation rope—if present, and of the travelling cable according to following formula:

$$\Delta B = um_{CR} - R \cdot um_{SR} - \tfrac{1}{2} um_{TC}.$$

16. The method according to claim 2, wherein the hoisting system compensation ΔB is calculated from constant speed portions of a test run of the elevator car preferably over a complete movement cycle as follows:

$$\Delta B_{up} = \frac{\mathrm{cov}(P_{ME \cdot up}, h_{up})}{\mathrm{var}(h_{up})} (v_{test} g)^{-1}$$

-continued $$\Delta B_{dn} = -\frac{\text{cov}(P_{MEdn}, h_{dn})}{\text{var}(h_{dn})}(v_{test}g)^{-1}$$

$$\Delta B = \frac{1}{2}(\Delta B_{up} + \Delta B_{dn})$$

with var( ) being the variance and cov( ) being the covariance.

17. The method according to claim 2, wherein the hoisting system balance $m_B$ is calculated according to following formula:

$$m_B = \frac{1}{2}((\text{mean}(P_{MEup}) - \text{mean}(P_{MEdn}))(gv_{test})^{-1}),$$

with "mean ($P_{MEup}$)" being the value of the motor power $P_{ME}$ in up-direction in the middle of the travelling length of the elevator car, and with "mean ($P_{MEdn}$)" being the value of the motor power $P_{ME}$ in down-direction in the middle of the travelling length of the elevator car.

18. The method according to claim 3, wherein the hoisting system balance $m_B$ is calculated according to following formula:

$$m_B = \frac{1}{2}((\text{mean}(P_{MEup}) - \text{mean}(P_{MEdn}))(gv_{test})^{-1}),$$

with "mean ($P_{MEup}$)" being the value of the motor power $P_{ME}$ in up-direction in the middle of the travelling length of the elevator car, and with "mean ($P_{MEdn}$)" being the value of the motor power $P_{ME}$ in down-direction in the middle of the travelling length of the elevator car.

19. The method according to claim 4, wherein the hoisting system balance $m_B$ is calculated according to following formula:

$$m_B = \frac{1}{2}((\text{mean}(P_{MEup}) - \text{mean}(P_{MEdn}))(gv_{test})^{-1}),$$

with "mean ($P_{MEup}$)" being the value of the motor power $P_{ME}$ in up-direction in the middle of the travelling length of the elevator car, and with "mean ($P_{MEdn}$)" being the value of the motor power $P_{ME}$ in down-direction in the middle of the travelling length of the elevator car.

20. The method according to claim 5, wherein the hoisting system balance $m_B$ is calculated according to following formula:

$$m_B = \frac{1}{2}((\text{mean}(P_{MEup}) - \text{mean}(P_{MEdn}))(gv_{test})^{-1}),$$

with "mean ($P_{MEup}$)" being the value of the motor power $P_{ME}$ in up-direction in the middle of the travelling length of the elevator car, and with "mean ($P_{MEdn}$)" being the value of the motor power $P_{ME}$ in down-direction in the middle of the travelling length of the elevator car.

* * * * *